United States Patent Office 3,515,360
Patented June 2, 1970

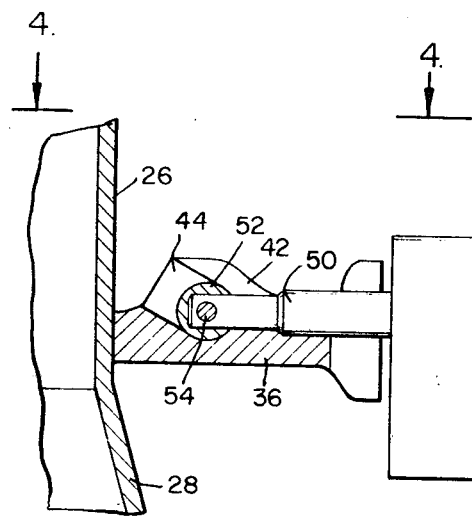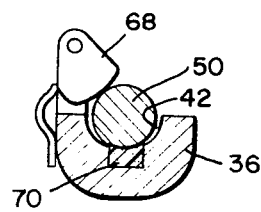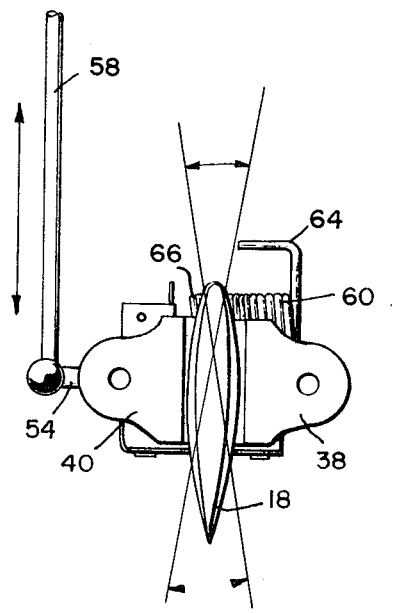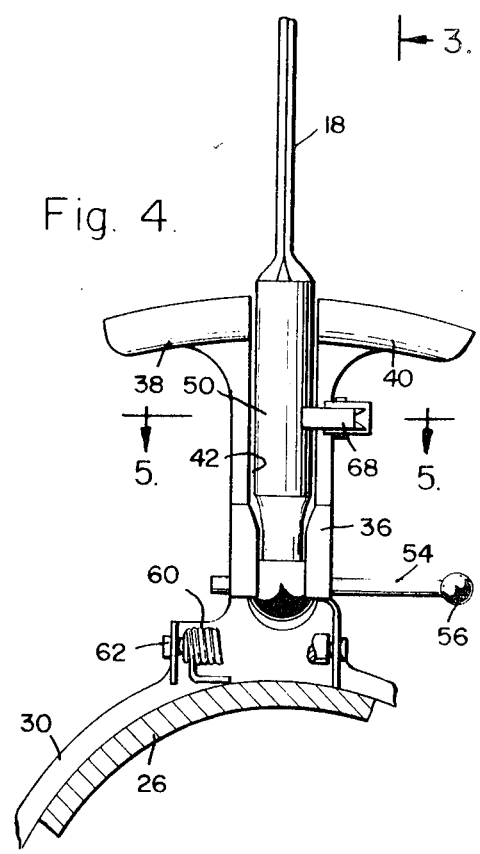

3,515,360
PIVOT SYSTEM FOR FOLDING CONTROL SURFACES
William F. Alexander, Inglewood, Calif., assignor to Hughes Aircraft Company, Culver City, Calif., a corporation of Delaware
Filed May 23, 1968, Ser. No. 731,661
Int. Cl. F42b 13/32
U.S. Cl. 244—3.28                                       7 Claims

ABSTRACT OF THE DISCLOSURE

Some missiles have movable control surfaces for missile guidance in flight, but the storage and in some cases firing of such missile requires that the control surfaces be out of the way. The control surfaces of the present invention are each mounted on a main ball with the main ball mounted in a ball socket interiorly of the missile skin. This ball mounting permits the control surfaces to lie within the confines of the missile skin and subsequently swing out for control of missile direction. Additionally, since the control surfaces are ball mounted, they can swing about their longitudinal axis for control motion. This is accomplished by a crank arm mounted through the ball, which crank arm is connected to the control motor. The crank arm passes through a slot in the ball socket, which slot restrains the control surfaces when they are in the folded position, and limits control motion of the control surfaces to that desired during the control phase of operation.

BACKGROUND OF THE INVENTION

This invention relates generally to a control system for folding control surfaces and in particular to a system for controlling the folding control surfaces of missiles.

In numerous applications it is desirable to fold the wings or the control surfaces of missiles so that the missile can be readily stored in a launch tube or cannon barrel of minimum complexity. Heretofore, folded control surfaces have generally required two separate hinging or pivoting devices, one for folding and one for guidance control. These prior art dual hinging methods have proven satisfactory for some applications. However, where space and weight considerations are critical, the dual system has encountered certain inherent limitations. In particular, with the dual hinging system the relatively large number of required parts of relatively close tolerance requirements result in increased weight and bulk as well as increasing the probability of loose joints which could produce undesirable flutter in the control surfaces during the flight of the missile.

BRIEF SUMMARY OF THE INVENTION

Briefly, the subject invention comprises a pivot system for folding control surfaces.

The shank of the control surface is attached to a main ball which is mounted in a ball socket and is retained and controlled by a crank arm which passes through elongated slot and two surfaces of the ball socket and through a hole formed through the main ball and the socket. The slots in the surface of the ball socket allow a selected degree of rotary movement of the shank of the conrtol surface when in the unfolded condition and therefore a selected degree of control of the surfaces. The crank arm has an actuator ball formed on one end thereof with the actuator ball being connected to a socket on one end of a steering rod so as to transmit motion from a steering power supply. The main ball and socket serves as a hingle for folding and as a pivot point for guidance. The actuator ball and socket maintains a connection to the steering rod during folded and unfolded positions of the control surface so that the control surface is immediately controllable as soon as it is unfolded.

BRIEF DESCRIPTION OF THE DRAWINGS

FIG. 2 is a partial view similar to FIG. 1, partially in section, showing one of the control surfaces in the unfolded, controlling position.

FIG. 3 is a view taken generally along the line 3—3 of FIG. 2.

FIG. 4 is an enlarged section taken generally along line 4—4 of FIG. 2.

FIG. 5 is a section taken generally along the line 5—5 of FIG. 4.

DESCRIPTION OF THE PREFERRED EMBODIMENT

Figure 1:
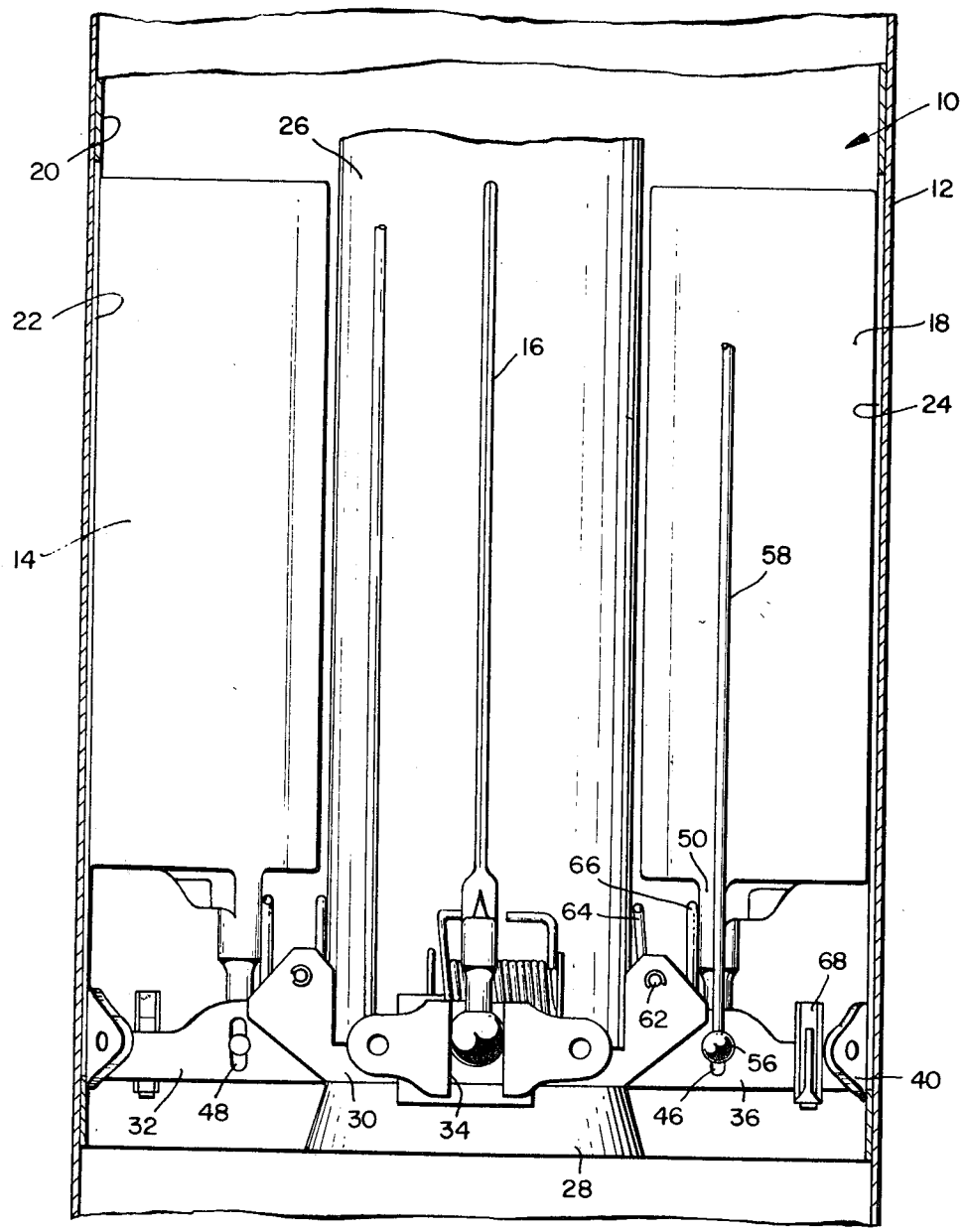
FIG. 1 is a side elevational view of a portion of the missile, with a portion of the skin removed showing a side elevational view of the pivot system for folding control surfaces with the control surfaces in the folded position.

Referring to the drawings, a missile is generally indicated at 10. Missile 10 is mounted in tube 12 before firing, or is otherwise conveniently constrained. In any event, the constraint includes means to restrain the control surfaces within the retracted position prior to firing, and to permit them to be released upon firing. The control surfaces are shown in their restrained, folded position in FIG. 1 at 14, 16 and 18. Missile 10 has an outer skin 20 within which there are appropriately positioned slots 22 and 24 to permit the control surfaces to swing out. There are, of course, the requisite number of control surfaces for proper control. In the present, preferred embodiment, there are four such control surfaces, one being on the far side of missile 10 and not visible in the drawings. Interiorly the skin 20, missile 10 has thrust tube or motor nozzle 26. The rear end of the thrust tube carries nozzle 28 from which propellant gasses are expelled for missile thrust.

Mounting strap 30 engages around thrust tube 26 adjacent its rear end, next to nozzle 28. It serves as a mounting means for properly supporting the control surfaces. Support brackets 32, 34 and 36 extend radially outward from the mounting strap 30, and are preferably formed integrally therewith. The outer end of the support bracket terminates in shoes, such as shoes 38 and 40 illustrated with respect to bracket 36. These shoes engage the interior of skin 20 and are secured thereto for mutual support.

Each of the support brackets is identical, and for convenience the support bracket 36 will be described in detail. Support bracket 36 has a radially oriented, upwardly directed groove 42 therein. Furthermore, it has a downwardly and outwardly directed cylindrical bore 44 which has a hemispherical bottom therein. Groove 42 intersects with cylindrical bore 44. As is seen in FIG. 1, upwardly directed slot 46 extends through bracket 36 on the center line of the hemispherical bottom of bore 44. A symmetrically identical slot 48 is illustrated in support bracket 32 on the left side of FIG. 1.

Each of the control surfaces is carried on a supporting shaft. Shaft 50 is illustrated with respect to control surface 18, and is preferably integrally formed with the control surface. Shaft 50 is of such diameter as to lie within the groove 42 when the control surfaces in the extended position of FIGS. 2 through 4, as is illustrated in FIG. 2. Ball 52 is positioned in the hemispherical seat formed at the bottom of cylindrical bore 44, and shaft 50 terminates within ball 52.

Shaft 50 is retained within the ball 52 by means of crank arm 54 which extends through slot 46 in the side of bracket 36, through ball 52, through shaft 50 and extends at least into slot 48 on the other side of bracket 36. In view of the fact that slots 46 and 48 are parallel to the axial missile center line, it also prevents movement of ball 52 out of its hemispherical ball socket. In addition, this orientation of slots 46 and 48 retain the control surfaces in the radial position when they are in the folded position, but permits rotation of the control surfaces about the axis of shaft 50 when the control surfaces are in the extended position. The end of crank arm 54 carries ball and socket connection 56 which in turn is connected to steering rod 58 which is connected to actuator means for angularly orienting the control surfaces for directing the missile in the desired direction in flight.

Slot 46 is predetermined limited length to limit the angular rotation of shaft 50 about its axis when the control surfaces are extended. Through the use of slots 46 and 48 as the control surface angular limit, limiting devices need not be built into the control surface motivating means. A maximum angle of deflection or motion of the control surfaces from a center, non-guiding position, will be 45° on each side of the center position.

Coil spring 60 is mounted upon pin 62 which is carried on a bracket on support bracket 36. Coil spring 60 has a first end 64 which engages against thrust tube 26 and a second end 66 which engages against shaft 50. Coil spring 60 is in torsion to urge control surface 18 from the folded position of FIG. 1 to the extended position of FIGS. 2 through 4 wherein shaft 50 lies in the bottom of groove 42. If desired, spring loaded pawls, such as the one illustrated at 68 can retain the control surfaces in their extended position. In order to prevent bounce of the control surfaces as they swing outward under the torsional effect of their springs, a crushable or malleable material 70 is preferably positioned in the bottom of groove 42 so that upon extension of the control surfaces, the energy is absorbed by deformation of the crushable or malleable material.

In operation, the control surfaces are retained in the folded position by the positioning of the missile within a tube 12. In this position, the control surfaces are radially arranged and are constrained in the radial position by the constraint of crank arm 54 in slots 46 and 48. In this position, no rotation around the axis of shaft 50 is permitted by the restraint of crank arm 54 in slots 46 and 48. When the missile is fired, it is ejected from tube 12, and as soon as it is free, the control surfaces swing outwardly through the slot in the missile skin, for they are no longer restrained. They are swung outwardly under the force of the coil springs. As they approach the extended position stopping shock is absorbed by crushing pads 70. When fully extended, they are stopped by shaft 50 engaging in the bottom of groove 42. They are retained in this position by aerodynamic forces, by the coil springs, and by pawl 68. In this position, slots 46 and 48 are normal to the axis of shaft 50 so that rotation of shaft 50 about its axis is permitted. Such rotation is accomplished by crank arm 54 as driven in appropriate control direction by steering rod 58. Thus, the control surfaces are stored in protected position and in a position wherein the missile can be tube launched, and when launching is completed they are promptly available for missile directional control.

This invention having been described in its preferred embodiment, it is clear that it is susceptible to numerous modifications and embodiments within the ability of those skilled in the art and without the exercise of the inventive faculty.

What is claimed is:
1. A folding control surface for a missile:
   mounting means for said control surface, said mounting means being adapted to be secured to a missile structure, said mounting means including a ball socket;
   a ball on said control surface, said ball being positioned within said ball socket so that said control surface can swing from an inoperative, folded position to an operative, unfolded position by rotation on said ball and said control surface can rotate on said ball when in its unfolded position for controlling the missile;
   said mounting means having an axis and said folding control surface having an axis, and further including a slot through said mounting means on the center line of said ball socket, said slot being parallel to said axis of said mounting means, a crank arm through said slot and through said ball so that said crank arm in said slot restrains rotation of said control surface about its axis when said control surface is in its folded position with its axis substantially parallel to said axis of said mounting means and permits rotation of said control surface about its axis when said control surface is in its unfolded position with its axis substantially normal to the axis of said mounting means.

2. The folding control surface of claim 1 wherein: a shaft is formed on said control surface and said shaft passes into said ball and said crank arm passes through said ball and said shaft to retain said ball and said shaft with respect to each other.

3. The folding control surface of claim 2 wherein: said mounting means has a groove therein, said groove intersecting said ball socket, said shaft lying in said groove when said control means is in its unfolded position.

4. The folding control surface of claim 3 wherein: a clamp restrains said shaft in said groove.

5. The folding control surface of claim 3 wherein: a spring is engaged on said mounting means and against said control surface, said spring urging said control surface away from its folded condition toward its unfolded condition.

6. The folding control surface of claim 5 wherein: a control rod is pivotally connected to said crank arm so that said control rod is connected to said crank arm while said control surface is in its folded position and while it is in its unfolded position so that said control rod can control the rotative position of said control surface about its axis when said control surface is in its unfolded condition.

7. A folding control surface for a missile;
   mounting means for said control surface, said mounting means being adapted to be secured to a missile structure, said mounting means including a ball socket therein;
   a control surface, said control surface having a ball thereon, said ball being positioned within said ball socket, a first axis of rotation of said control surface, said first axis passing through said ball, a second axis of rotation through said ball at substantially right angles to said first axis of rotation so that said control surface can swing from an inoperative, folded position by rotation on said second axis to an operative, unfolded position, and said control surface can rotate on said ball on said first axis when said control surface is in an unfolded position for controlling the missile.

References Cited
UNITED STATES PATENTS

| | | | |
|---|---|---|---|
| 1,121,616 | 12/1914 | Drocar | 102—3 X |
| 1,277,225 | 8/1918 | Lauesen | 102—3 |
| 2,465,401 | 3/1949 | Skinner | 244—3.28 |
| 3,273,500 | 9/1966 | Kongelbeck | 244—3.28 |

VERLIN R. PENDEGRASS, Primary Examiner